W. M. SIMMONS.
DOOR OPERATING DEVICE.
APPLICATION FILED AUG. 16, 1913.
1,122,317.
Patented Dec. 29, 1914.
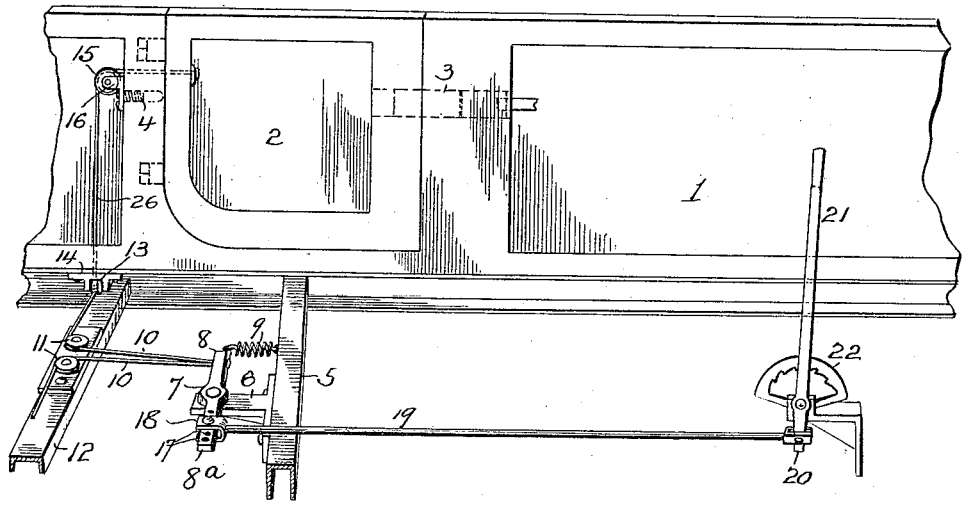
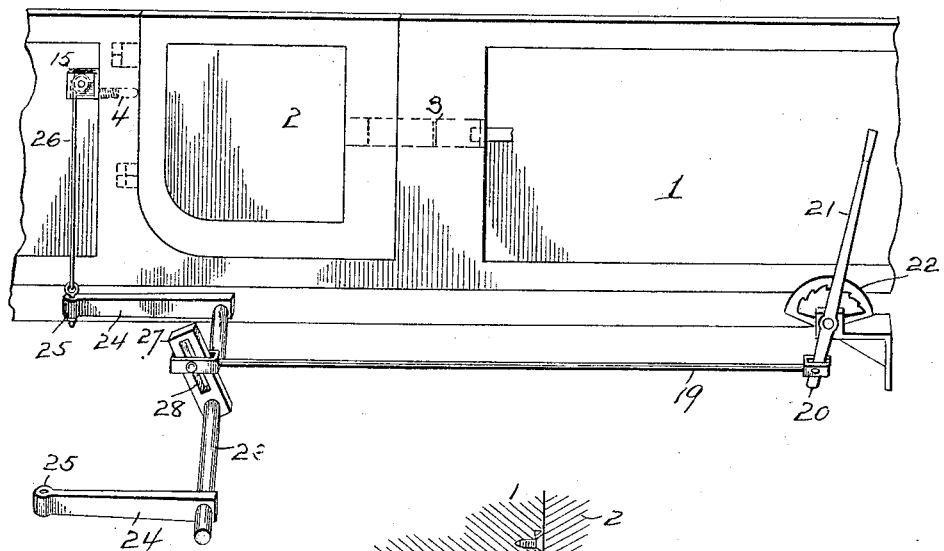
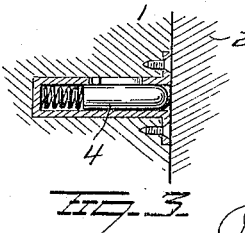
WITNESSES
INVENTOR
W. M. Simmons
By H. A. Seymour
Attorney

UNITED STATES PATENT OFFICE.

WILLIAM M. SIMMONS, OF BURLINGTON, IOWA.

DOOR-OPERATING DEVICE.

1,122,317.  Specification of Letters Patent.  Patented Dec. 29, 1914.

Application filed August 16, 1913. Serial No. 785,184.

*To all whom it may concern:*

Be it known that I, WILLIAM M. SIMMONS, of Burlington, in the county of Des Moines and State of Iowa, have invented certain new and useful Improvements in Door-Operating Devices; and I do hereby declare the following to be a full, clear, and exact description of the invention, such as will enable others skilled in the art to which it appertains to make and use the same.

This invention relates to improvements in door operating devices and more particularly to such as are adaptable for use in controlling the operation of vehicle doors,—the object of my present invention being to provide simple and efficient devices arranged to be controlled by the operations of the emergency brake lever of an automobile for closing the doors of the vehicle and for holding them closed when the brake lever is in "released" position, said devices being operable to permit either or both of the doors at respective sides of the vehicle to be opened when the brake lever is thrown to position to set the brakes.

With this object in view, the invention consists in certain novel features of construction and combinations of parts as hereinafter set forth and pointed out in the claims.

In the accompanying drawings, Figure 1 is a sectional view of a portion of the body of a vehicle showing the application of my improvements thereto, Fig. 2 is a view of a modification and Fig. 3 is a detail view.

1 represents the body of a vehicle and 2 one of the hinged doors, suitable latch devices for each door being illustrated at 3. Spring-actuated plungers 4 are mounted in the frame of the body 1 and bear against the doors for opening the same when released by the operation of the latch devices.

To one of the cross beams 5 of the body or frame 1, a rearwardly projecting bracket 6 is secured and to this bracket, a lever 7 is pivotally supported between its ends. The arm 8 of lever 7 is connected by a spring 9 with the beams, and to said arm 8 of lever 7, two cords or flexible devices 10 are connected. These cords extend rearwardly from their connection with the lever and pass about pulleys 11 mounted on a cross beam 12 of the frame or body. From the pulleys 11, the cords extend laterally toward the sides of the vehicle body and each cord passes about a pulley 13 mounted in a bracket 14 secured to the body 1. After passing pulley 13, each cord extends upwardly and over a pulley 15 mounted in a bracket 16 secured to the body in rear of the hinged edge of the door. From the pulley 15, each cord is extended forwardly and is secured to the adjacent hinged door 2 near the hinged edge thereof.

The arm 8ª of the lever 7 is provided with a plurality of holes 17 for the accommodation of a pin 18, for affording an adjustable pivotal connection of a rod or pitman 19 with said arm 8ª of lever 7. The forward end of the rod 19 is connected with an arm 20 depending from the emergency brake lever 21 and the latter is provided with a suitable detent to coöperate with a toothed segment 22. The emergency brake (not shown) is connected with the brake lever in the usual way.

When the brake lever 21 is in position to release the brakes (as shown in Fig. 1) the cords 10 will be held taut and the doors will therefore be held closed. Should the brake lever be moved rearwardly to "set" the brakes, motion will be imparted through the rod 19, to turn the lever 7 on its fulcrum (against the resistance of the spring 9) and the cords 10 will be slackened. When the cords shall have been thus slackened, either or both of the doors will be permitted to swing to open position, when the same shall have been released by operation of the latch devices 3,—the door or doors being then forced open by the action of the spring actuated plunger or plungers 4. Should one or both of the doors be open when the brake lever 21 is moved to release the brake, motion will be imparted, through the rod 19 and lever 7, to the cords 10 and the doors will be pulled by said cords to closed position and prevented from being again opened as long as the brake lever remains in "release" position.

In the construction shown in Fig. 2, a shaft 23 is mounted transversely in the vehicle body and provided at each end with an arm 24. Each arm 24 is provided at or near its free end with an eye 25 with which a cord 26 is connected. The cords 26 extend upwardly from their connection with the arms 24 and, after passing over pulleys 15, are attached to the respective doors 2, near the hinged sides of the latter.

The shaft 23 is provided intermediate of its ends, with an arm 27 having a slotted portion 28 with which one end of rod 19 is adjustably connected, the forward end of the rod being connected with the arm 20 of the emergency brake lever 2.

When the brake lever is in its forward or "release" position, the parts will assume the positions shown in Fig. 2, with the arms 24 at the ends of the shaft 23 in their lowest position and the cords 26 taut. The doors will thus be held in their closed positions when the brake lever is set to release the brakes, even if the latches 3 be operated in a manner to release the doors. When the brake lever is moved rearwardly to apply the brakes, motion will be imparted through the rod 19 and arm 27 to partially rotate or rock the shaft 23 and thus cause the arms 24 to be raised. When the arms 24 are thus raised, the cords will become slackened. Should either of doors be now released by the operation of the latch devices therefor, such door would be forced to open position by the operation of the spring-actuated plunger connected with such door. When the door swings open, the cord connected therewith will become taut. If the other door be released, by the operation of the latch devices 3, the operations will be precisely the same as above described.

If one or both of the doors be open, operation of the brake lever in a direction to release the brakes, will cause the shaft 23 to be rocked in a direction to cause the arms 24 to descend and impart motion, through one or both of the cords 26, to close the door or doors.

It will be seen that in the construction shown in Fig. 2, the shaft 23 and arms 24 and 27 constitute a lever for operating the cords 26, to slacken them for permitting the doors to be opened or for pulling them to close the doors.

Slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. The combination with the oppositely disposed doors of a vehicle, and an operating lever, of a lever pivoted to the frame of the vehicle and having two arms, flexible devices connecting one of said arms with the doors for moving the latter in one direction, a connection between the other of said arms and the operating lever, and means for locking said operating lever.

2. The combination with a vehicle, a hinged door therefor, and a brake lever, of a lever having two arms, pivotally mounted on the vehicle, a flexible connection extending from one of said arms to the hinged door, a connection between the other of said arms and the brake lever, and means for locking the brake lever, whereby said door will be closed and held in closed position when the brake lever is moved to position to release the brake, and whereby said door will be released and permitted to be opened when the brake lever is moved to position to apply the brakes.

3. The combination with a vehicle, a door therefor, and an operating lever, of a lever having two arms, pivotally mounted on the vehicle, a cord extending from one of said arms to the door, pulleys for said cord, a rod connected at one end with the other of said arms and at the other end with the operating lever, and means for locking said operating lever.

4. The combination with a vehicle, doors therefor, and an operating lever, of a lever having two arms, pivotally mounted on the vehicle, cords connecting one of said arms with the doors, pulleys for said cords, a spring for moving said lever in one direction, a rod connecting the other of said arms with the operating lever, and means for locking said operating lever.

In testimony whereof, I have signed this specification in the presence of two subscribing witnesses.

WILLIAM M. SIMMONS.

Witnesses:
 E. L. WARE,
 SOL. FEINBERG.

Copies of this patent may be obtained for five cents each, by addressing the "Commissioner of Patents, Washington, D. C."